July 21, 1931.  C. T. McCUE  1,815,792
ATTACHMENT OF FASTENERS
Filed July 20, 1928  2 Sheets-Sheet 2
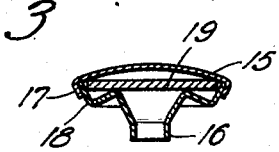
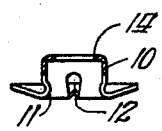
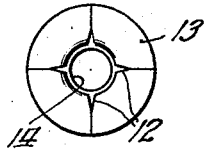
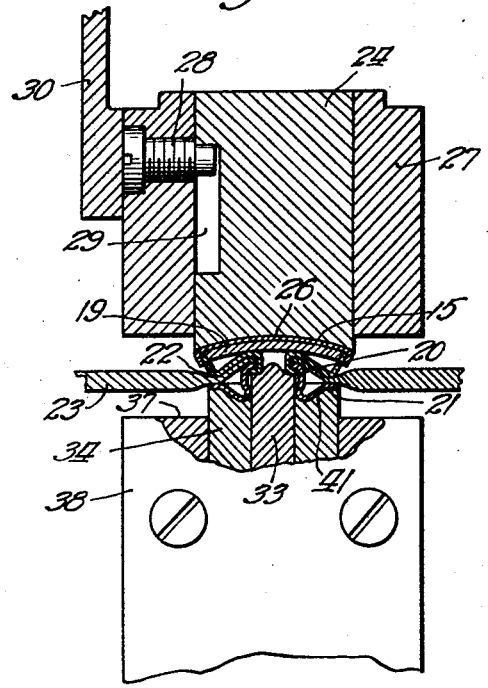
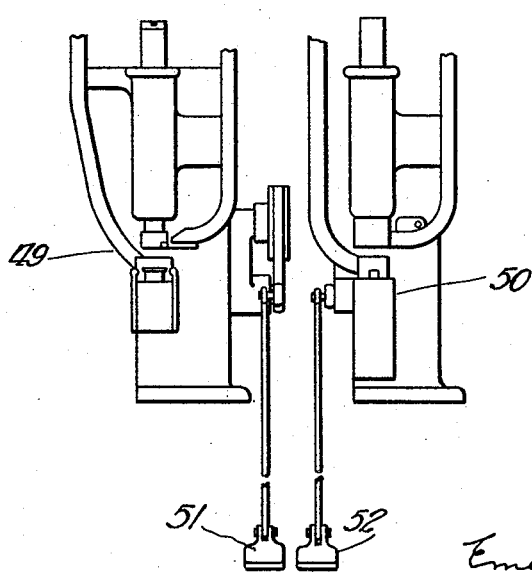
Inventor
Charles T. McCue
Emery, Booth, Janney & Varney, Attys.

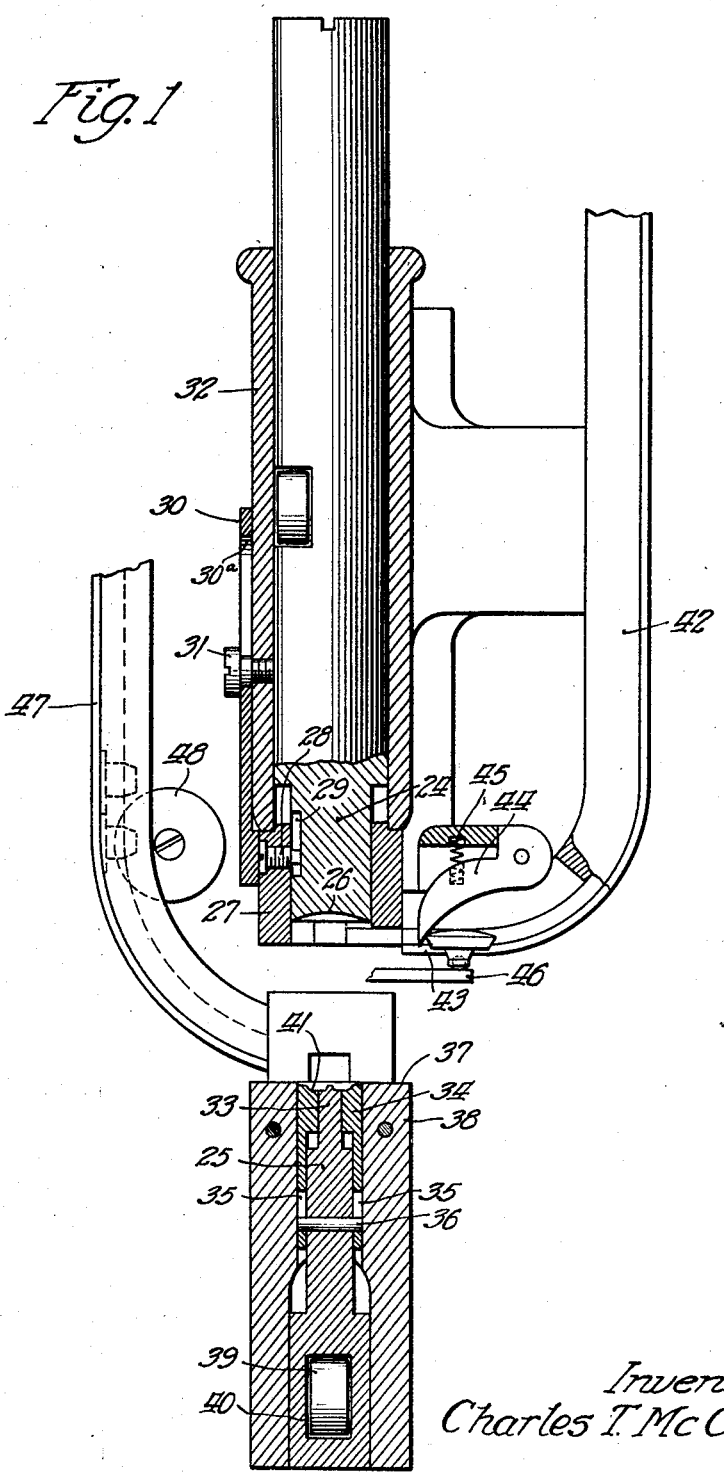

Patented July 21, 1931

1,815,792

UNITED STATES PATENT OFFICE

CHARLES T. McCUE, OF DETROIT, MICHIGAN, ASSIGNOR TO UNIVERSAL BUTTON FASTENING & BUTTON COMPANY, OF DETROIT, MICHIGAN, A CORPORATION OF MICHIGAN

ATTACHMENT OF FASTENERS

Application filed July 20, 1928. Serial No. 294,084.

This invention relates to the machine attachment of snap fasteners and aims to provide improved machines for attaching snap fastener elements without distortion, which machines are adapted to be utilized in an improved method of increasing the efficiency and lowering the costs of the manufacturing operations involved in providing garments and the like with securing means.

The nature of the invention may be readily understood by reference to one illustrative embodiment thereof shown in the accompanying drawings.

In said drawings:

Fig. 1 is an enlarged partial front sectional elevation of a machine showing the cooperating attaching dies;

Fig. 2 is a similar view of still greater enlargement showing the attaching dies in the position of completing the attachment of a snap fastener element;

Fig. 3 is a sectional elevation of a typical attaching rivet;

Figs. 4 and 5 are sectional elevation and plan view, respectively, of a typical snap fastener socket element; and Fig. 6 is an elevation illustrating an apparatus unit for attaching stud and socket snap fastener elements according to the improved method.

The automatic attachment of the elements of a snap fastener presents a number of problems not encountered in the attachment of other fastening means such as buttons. The inter-fitting stud and socket portions of the snap fastener elements must be accurately and uniformly made to provide the proper separation resistance without requiring a special selection or test of those elements which will ultimately fit or snap together. In other words, the snap fastener elements must not separate too easily nor yet too difficultly; and to secure this result in a practicable manner they must be exactly uniform and must be attached without distortion either of the stud or socket part,—for even slight and imperceptible distortion would destroy the uniformity of inter-locking fit and consequently of separation resistance. The thin metallic structure of the interfitting portions of the snap fastener elements makes the prevention of distortion a difficult problem, particularly in connection with rapid attachment by automatic machines.

In my co-pending application Serial No. 262,691 filed March 19, 1928, I have disclosed one form of machine for automatically attaching the stud elements of a snap fastener in a manner to protect the stud from any distortion during the attaching operation. In this application I have disclosed the pertinent features of a similar machine for automatically attaching the socket elements of a snap fastener. Since the general structure and operating mechanisms of the present illustrative machine form no part of the present invention, I have illustrated in the drawings only the details which characterize the present machine and which embody the distinguishing principles of the invention as applied to the attachment of snap fastener socket elements. Such details may be readily embodied in the type of machine shown in my co-pending application or in other types of machines.

The invention also involves the cooperative use of stud attaching and socket attaching machines to carry out a novel and efficient method of attaching snap fasteners to garments. According to the illustrative method stud attaching machines and socket attaching machines are employed in pairs arranged relatively closely so that one operator seated in front of the apparatus unit may operate both machines. The machines are relatively arranged to attach the respective fastener elements on adjacent faces of portions of a garment or the like which overlap when fastened together. Thus garments may be supplied with fastening means in a single handling thereof and the attachment of the fastening elements may be effected by simple handling movements and without any awkward and time consuming reversal of any portion of the garment.

The typical socket element herein shown for purposes of illustration embodies a cup-like recess 10 contracted at its mouth 11 so that the opening therein will be of smaller diameter than the diameter of the interior of the recess 10 (see Figs. 2, 4, and 5). At separated points 12 around the recess the metal of the snap fastener element is slit so that the recess, particularly the mouth thereof, may yield and again contract, upon the insertion of the stud of a mating snap fastener element. The socket element is in this instance provided with a laterally extending cloth engaging flange 13 which is adapted, in cooperation with the head of the attaching rivet, tightly to grip the intervening web of cloth. The bottom of the recess of the socket element is provided with an attaching perforation 14 through which the extremity of the attaching rivet may pass.

The attaching rivet in this instance comprises a head 15 and a tubular shank 16 of a diameter adapted to enter the opening 14 in the socket. The rivet head in this instance is formed of a shell 17 crimped about a collet 18 and enclosing a deformable disc 19.

In the attaching operation during which the rivet and socket are firmly pressed together and against the cloth, the extreme end of the tubular rivet shank is expanded as at 20 inside the socket recess (see Fig. 2), and the collet 18 is reduced in height by upsetting it and bending the disc 19 until the latter conforms to the curvature of the shell 17 (see Fig. 2). The flange 13 of the socket is marginally flattened at 21 to provide a cloth engaging face opposite that of the under side 22 of the rivet head, between which faces the cloth web 23 is tightly gripped.

The aforesaid attaching operation is performed in this instance by cooperating upper and lower dies 24 and 25. The upper die, whose lower face 26 is shaped to conform to the contour of the rivet head, is surrounded adjacent its extremity by a movable holder 27 adapted to receive and temporarily hold a rivet. The holder 27 is sleeve-like in form and is operatively associated with the die by a lost motion connection provided by the screw pin 28 traveling in a slot or elongated recess 29. The bottom of slot 29 limits the upward movement of die 24 relative to holder 27. The downward movement of holder 27 is checked at the proper point (see Fig. 1) by the engagement of the upper end of slot 30ª in bar 30 with the screw 31 carried by the die housing 32. Upward movement of holder 27 starts when the end of the die has partly receded into the holder, and is checked when the holder engages the lower end of housing 32 or the screw 31 engages the lower end of slot 30ª. In this position the die has receded far enough so that a rivet may be placed in the holder.

The lower die 25 comprises a movable upsetting element 33 surrounded by a relatively movable sleeve 34 having a lost motion connection with the die 25. This lost motion connection in this case is effected by opposite slots 35 in the sleeve 34 in which operates a pin 36 carried by the die 25. The relative position of pin and slots is such that in the lower position of die 25 the pin 36 by engagement with the bottom of slots 35 carries sleeve 34 to a position flush with or slightly below the upper surface 37 of the die carrying structure 38.

The die 25 together with sleeve 34 is appropriately raised and lowered by a lever 39 whose end operatively engages a recess 40 in the lower portion of the die 25.

When a rivet has been placed in the holder 27 and a socket seated upon the die 25 and its sleeve 34 (in the position shown in Fig. 1), the dies may then be brought together against an intervening web of cloth, into the position shown in Fig. 2. During this operation the extremity of the tubular rivet shank punches or perforates the cloth and thereupon is engaged by the upper end of upsetting tool 33 which upsets the rivet inside the socket recess as shown, for example, in Fig. 2. In the latter position the lost motion between die 25 and its sleeve has permitted the latter to fall back until their relative positions are as indicated in Fig. 2, whereupon the engagement of pin 36 with the upper end of slots 35 carries the sleeve upward without further relative movement. When projecting beyond the sleeve 27 as indicated in Fig. 2, the upsetting tool 33 and the upper surface of sleeve 34 conform substantially to the final contour of the socket element. The diameter of tool 33 is designed to be approximately that of the socket mouth 11 and the upper surface 41 of sleeve 34 conforms substantially to the contour of the socket flange 13. Thus, during the coaction of the upper and lower attaching dies the sleeve 34 and tool 33 cooperate to prevent the distortion of the socket element, particularly of any portions of the socket which might vary the diameter of the mouth 11 of the socket. It will be apparent that the cylindrical sides of the tool 33 prevent any contraction in this critical diameter, and the converging surface of the face 41 of sleeve 34 prevents any expansion or enlargement in this diameter.

The upper and lower dies may be operated and co-ordinated in their movements by any appropriate mechanism, but since the details of such mechanism form no part of the present invention, they have not been illustrated nor described. In my co-pending application is illustrated one type of operating mechanism suitable for use in the present machine. Rivets and socket elements may be supplied to the attaching dies in any appropriate manner. I have indicated in Fig. 1 a rivet raceway 42 whose discharge extremity 43 is controlled by a pivoted finger 44 which is pressed downwardly by spring 45 to prevent escape of rivets from the raceway. From the discharge end of the raceway the rivets may be moved one at a time by an oscillating arm 46 from discharge position to the holder 27. Since the details of this mechanism form no part of the present invention I have illustrated them only generally, and refer to my copending application for a full disclosure of one appropriate placing mechanism.

Likewise the socket feeding and placing mechanism forms no part of the present invention. I have illustrated generally a socket raceway 47 controlled by an oscillating notched disc 48 capable of being operated to release one socket at a time, which upon such release slides down the curved portion of the raceway and is thereupon pushed forward to a position over the die 25 and its sleeve (which in the position shown in Fig. 1 are depressed so as to form a slight recess which centers the socket).

It will be observed that the machines illustrated in the present and co-pending applications attach the respective fastener elements in facing positions, i. e., on adjacent faces of portions of the cloth intended to overlap. Specifically the present machine attaches the sockets on the under side of the interposed web of material and that shown in my copending application attaches sockets on the upper side of the interposed web of material. Pairs of these respective machines may be organized into apparatus units for use in practicing my improved method. An illustrative unit is shown in Fig. 6, in which a stud attaching machine 49 is the left hand member of the unit and a socket attaching machine 50, spaced a short distance therefrom, the right hand member. The machines are provided with adjacent control means in the form of foot pedals 51 and 52 positioned to be actuated by a single operator stationed in front of the unit in position to pass articles conveniently through both machines.

Units of this character may be utilized, therefore, to provide garments or the like with fastening means in a single handling of the garment and by a single operator with a minimum of movement. For example, in attaching snap fasteners to workmen's coats the operator may attach a line of stud elements by the machine at the left hand, and without turning over the garment may attach a line of socket elements along the other edge of the garment by means of the other machine. The coats and other garments are usually supplied to the operator in piles of more or less regularly arranged garments in which the portions thereof to receive the fastener elements assume approximately uniformly the normal relation to each other, i. e., the relation they have in the use of the garment,—so that the operator may follow the same movements with each garment in attaching the fastener elements and may pass each garment through the pair of attaching machines without material pre-arrangement of the garment or turning over any part thereof to place it in proper position to receive both sets of fastener elements. This contributes to the efficiency of the operation.

The attachment of the garment fastening means by a single handling of the garment in what is practically a single factory operation on the garment, effects a substantial saving in manufacturing costs not only by minimizing movements in the operation itself but through the elimination of entirely separate operations and the additional handling of the garment which would be necessitated thereby. This is apparent, for example, by comparison with the manufacture of garments having button and button hole fastening means. The attachment of the buttons involves entirely separate operations, performed by different operators on different machines, from those for forming the button holes. Such operations involve not only a plurality of separate and distinct handlings of each garment but require a certain amount of re-arrangement between successive operations.

Obviously the invention is not limited to the details of the illustrative construction, since these may be variously modified. Moreover it is not indispensable that all features of the invention be used conjointly since various features may be used in different combinations and sub-combinations.

Having described one embodiment of my invention, I claim:

1. In a machine for attaching snap fastener socket elements the combination comprising a lower die having a central upsetting tool and a sleeve surrounding said tool and movable relative thereto, said tool being of a diameter substantially equal to the internal diameter of the mouth of the socket element, said sleeve having its upper end shaped to conform to the face of a socket element, means for limiting the relative movement of said tool and sleeve so that during the upsetting operation the tool projects beyond the sleeve a distance corresponding with the depth of the socket and cooperates with the sleeve to hold the socket element against distortion during the attaching operation, a holder for carrying said tool and sleeve, and means for moving said tool and sleeve to a position substantially flush with the upper end of said support to receive a socket element.

2. In a machine for attaching snap fastener socket elements the combination comprising a lower die having a central upsetting tool and a sleeve surrounding said tool and movable relative thereto, said tool being of a diameter substantially equal to the internal diameter of the mouth of the socket element, said sleeve having its upper end shaped to conform to the face of a socket element, means for limiting the relative movement of said tool and sleeve so that during the upsetting operation the tool projects beyond the sleeve a distance corresponding to the depth of the socket and cooperates with the sleeve to hold the socket element against distortion during the attaching operation, a holder for carrying said tool and sleeve, and means for permitting said tool to move downwardly relative to said sleeve so as to bring its upper end substantially to the level of the upper end of the sleeve for receiving a socket element to be attached.

3. In a machine for attaching snap fastener socket elements the combination comprising a lower die having a central upsetting tool and a sleeve surrounding said tool and movable relative thereto, said tool being of a diameter substantially equal to the internal diameter of the mouth of the socket element, said sleeve having its upper end shaped to conform to the face of a socket element, means including a pin and slot connection between said tool and sleeve to permit a limited relative movement therebetween and to limit the upward movement of said tool relative to said sleeve so that when a socket element is seated on said sleeve the tool will project into the socket a distance corresponding to the depth of the socket, and means for raising and lowering said tool in the attaching operation.

4. A machine for attaching snap fastener elements having in combination, a sleeve formed with a central opening therein and adapted to support a fastener part having an opening, a tool slidably mounted within the opening in the sleeve and having a portion engageable with the central portions of said fastener part to secure the latter to a piece of material, means for actuating said sleeve to move the fastener part into engagement with the material, and means for effecting prior actuation of the tool, the engaging surfaces of said tool and sleeve corresponding to the contour of the fastener part and being maintained in rigid engagement therewith during the attaching operation so as to prevent distortion of said part.

5. In a machine for attaching snap fastener socket elements, the combination with a die assembly comprising a reciprocable member and means for holding a rivet in operative relation with the member, of a cooperating die section having an upsetting tool adapted to project into an opening within a socket part, a sleeve surrounding said tool and movable relative thereto, the upper end portions of said sleeve and tool forming a continuous surface in one relative position thereof for supporting a fastener part, means for moving the tool relative to the sleeve to extend the same within the fastener parts, means operable subsequent to the operation of the means for moving the tool for moving the sleeve into engagement with the base portion of the fastener part to support the same, and means for actuating the cooperating die member aforesaid for upsetting the rivet inside of the socket part to attach the latter to an interposed web of material.

In testimony whereof, I have signed my name to this specification.

CHARLES T. McCUE.